US012694603B2

(12) United States Patent
Sodagar

(10) Patent No.: US 12,694,603 B2
(45) Date of Patent: Jul. 28, 2026

(54) METHOD AND APPARATUS FOR SIGNALING A USER'S SAFE ZONE FOR 5G AUGMENTED/MIXED REALITY APPLICATIONS

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 191 days.

(21) Appl. No.: 18/441,778

(22) Filed: Feb. 14, 2024

(65) Prior Publication Data

US 2024/0273803 A1 Aug. 15, 2024

Related U.S. Application Data

(60) Provisional application No. 63/532,860, filed on Aug. 15, 2023, provisional application No. 63/532,870, filed on Aug. 15, 2023, provisional application No. 63/466,611, filed on May 15, 2023, provisional application No. 63/445,894, filed on Feb. 15, 2023.

(51) Int. Cl.
*G06T 15/00* (2011.01)
*G06T 19/00* (2011.01)

(52) U.S. Cl.
CPC .......... *G06T 15/005* (2013.01); *G06T 19/006* (2013.01)

(58) Field of Classification Search
CPC ............................ G06T 15/005; G06T 19/006
See application file for complete search history.

(56) References Cited

U.S. PATENT DOCUMENTS

| | | | |
|---|---|---|---|
| 2019/0005728 A1* | 1/2019 | Leppanen | G06T 19/20 |
| 2019/0389066 A1 | 12/2019 | Jung et al. | |
| 2020/0234395 A1 | 7/2020 | Melkote Krishnaprasad et al. | |
| 2022/0130145 A1 | 4/2022 | Connary et al. | |

OTHER PUBLICATIONS

XR_FB_scene, The OpenXR Specification, Version 1.0.26, 2022, downloaded @ https://web.archive.org/web/20221219232745/https://registry.khronos.org/OpenXR/specs/1.0/html/xrspec.html#XR_FB_scene, 2022 (Year: 2022).*
XR_MSFT_scene_understanding, The OpenXR Specification, Version 1.0.26, 2022, downloaded @ https://web.archive.org/web/20221219232745/https://registry.khronos.org/OpenXR/specs/1.0/html/xrspec.html#XR_FB_scene, 2022 (Year: 2022).*

(Continued)

*Primary Examiner* — Yingchun He
(74) *Attorney, Agent, or Firm* — Sughrue Mion, PLLC

(57) ABSTRACT

A method, apparatus, and non-transitory computer readable medium are provided. The method may include determining, by an augmented reality (AR) enabled user device, an available visualization space associated with the AR user device; and signaling, by the AR user device, one or more parameters that indicate dimensions of the available visualization space. The one or more parameters may indicate a shape of the available visualization space. The method may include receiving, by the AR user device, AR media to be rendered based on the available visualization space, the AR media comprising one or more three-dimensional (3D) scene; and rendering the one or more 3D scene.

20 Claims, 7 Drawing Sheets

700

705 Determine An Available Visualization Space Associated With AR Device

710 Signal One or More Parameters Indicating Dimensions and/or Shape of the Available Visualization Space 715 Receive AR Media To Be Rendered Based on the Available Visualization Space 720 Render One or More 3D Scenes in AR Media

(56) References Cited

OTHER PUBLICATIONS

International Search Report dated May 15, 2024, issued in International Application No. PCT/US 24/15977.

Written Opinion dated May 15, 2024, issued in International Application No. PCT/US 24/15977.

Patrice Hirtzlin (Interdigital) et al: "[SD] On the support of real environment data", 141. MPEG Meeting; Jan. 16, 2023-Jan. 20, 2023; ONLINE; (Motion Picture Expert Group or ISO/IEC JTC1/SC29/WG11), No. m61811 Jan. 11, 2023 (Jan. 11, 2023), XP030307470, (total 8 pages).

Iraj Sodagar et al: "[MeCAR] Update on Available Visualization Space", 3GPP Draft; S4-230786; Type Discussion, 3rd Generation Partnership Project (3GPP), Mobile Competence Centre; 650, Route Des Lucioles; F-06921 Sophia-Antipolis Cedex; France, vol. SA WG4, No. Berlin, DE; May 22, 2023-May 26, 2023 May 16, 2023 (May 16, 2023), XP052309276, (total 4 pages).

Gilles Teniou et al: "Draft TS 26.119 v0.3.0", 3GPP Draft; S4-231560; Type Draft TS; Mecar, 3rd Generation Partnership Project (3GPP), Mobile Competence Centre; 650, Route Des Lucioles; F-06921 Sophia-Antipolis Cedex; France, vol. SA WG4, No. Goteborg, SE; Aug. 21, 2023-Aug. 25, 2023 Aug. 25, 2023 (Aug. 25, 2023), XP052451583, (total 34 pages).

EP Search Report issued Mar. 27, 2026 in European Application No. 24736998.6.

* cited by examiner

700

705 Determine An Available Visualization Space Associated With AR Device

710 Signal One or More Parameters Indicating Dimensions and/or Shape of the Available Visualization Space 715 Receive AR Media To Be Rendered Based on the Available Visualization Space 720 Render One or More 3D Scenes in AR Media

METHOD AND APPARATUS FOR SIGNALING A USER'S SAFE ZONE FOR 5G AUGMENTED/MIXED REALITY APPLICATIONS

CROSS-REFERENCE TO RELATED APPLICATION

This application claims priority from U.S. Provisional Application No. 63/445,894 filed on Feb. 15, 2023; U.S. Provisional Application No. 63/466,611, filed on May 15, 2023; U.S. Provisional Application Nos. 63/532,860 and 63/532,870, filed on Aug. 15, 2023, in the United States Patent and Trademark Office, the disclosures of each of which are incorporated herein by reference in their entirety.

FIELD

The disclosure generally relates to managing processes in a 5th generation (5G) mixed reality applications, and, in particular, to a method and apparatus for creating and updating available visualization zone experience in 5G augmented/mixed reality applications.

BACKGROUND

The 3rd Generation Partnership Project (3GPP) defines a work items on augmented reality devices and augmented/mixed reality (AR/VR) quality of experience metrics. However, no metrics or parameters are defined yet. Furthermore, there are no methods for dynamically updating the available visual space or signaling the parameters of the available visual space.

SUMMARY

According to one or more embodiments, a method is performed by at least processor for signaling available visualization space associated with a user in a mixed reality application. The method includes determining, by an augmented reality (AR) enabled user device, an available visualization space associated with the AR user device; signaling, by the AR user device, one or more parameters that indicate dimensions of the available visualization space, wherein the one or more parameters indicate a shape of the available visualization space; receiving, by the AR user device, AR media to be rendered based on the available visualization space, the AR media comprising one or more three-dimensional (3D) scene; and rendering the one or more 3D scene.

According to one or more embodiments, an apparatus for signaling available visualization space associated with a user in a mixed reality application, including at least one memory configured to store program code; and at least one processor configured to read the program code and operate as instructed by the program code. The program code may include determining code configured to cause the at least one processor to determine by an augmented reality (AR) enabled user device, an available visualization space associated with the AR user device; signaling code configured to cause the at least one processor to signal by the AR user device, one or more parameters that indicate dimensions of the available visualization space, wherein the one or more parameters indicate a shape of the available visualization space; receiving code configured to cause the at least one processor to receive by the AR user device, AR media to be rendered based on the available visualization space, the AR media comprising one or more three-dimensional (3D) scene; and rendering code configured to cause the at least one processor to render the one or more 3D scene.

According to one or more embodiments, a non-transitory computer readable medium having instructions stored therein, which when executed by a processor cause the processor to execute a method for signaling available visualization space associated with a user in a mixed reality application. The method may include determine, by an augmented reality (AR) enabled user device, an available visualization space associated with the AR user device; signal, by the AR user device, one or more parameters that indicate dimensions of the available visualization space, wherein the one or more parameters indicate a shape of the available visualization space; receive, by the AR user device, AR media to be rendered based on the available visualization space, the AR media comprising one or more three-dimensional (3D) scene; and render the one or more 3D scene

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
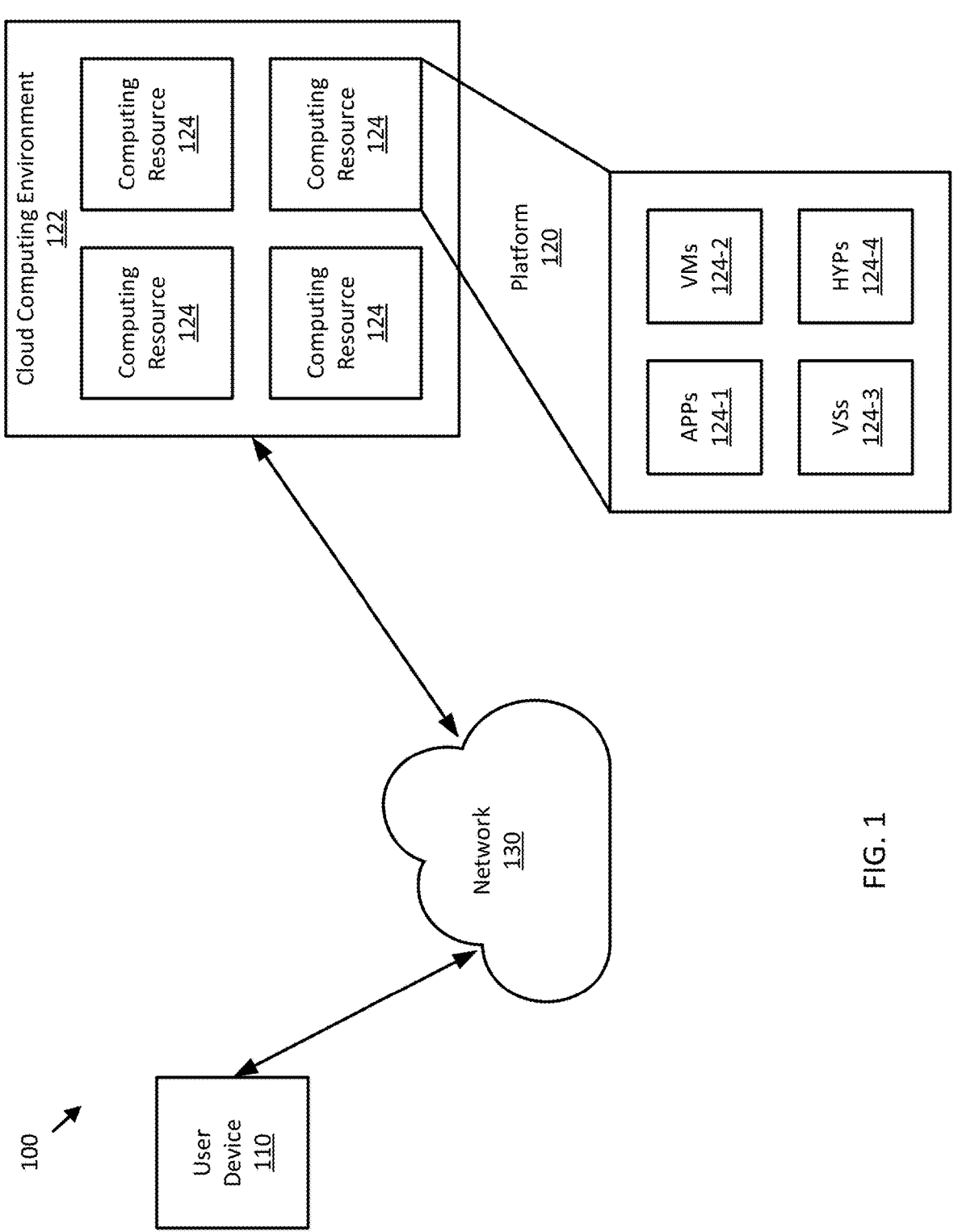
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
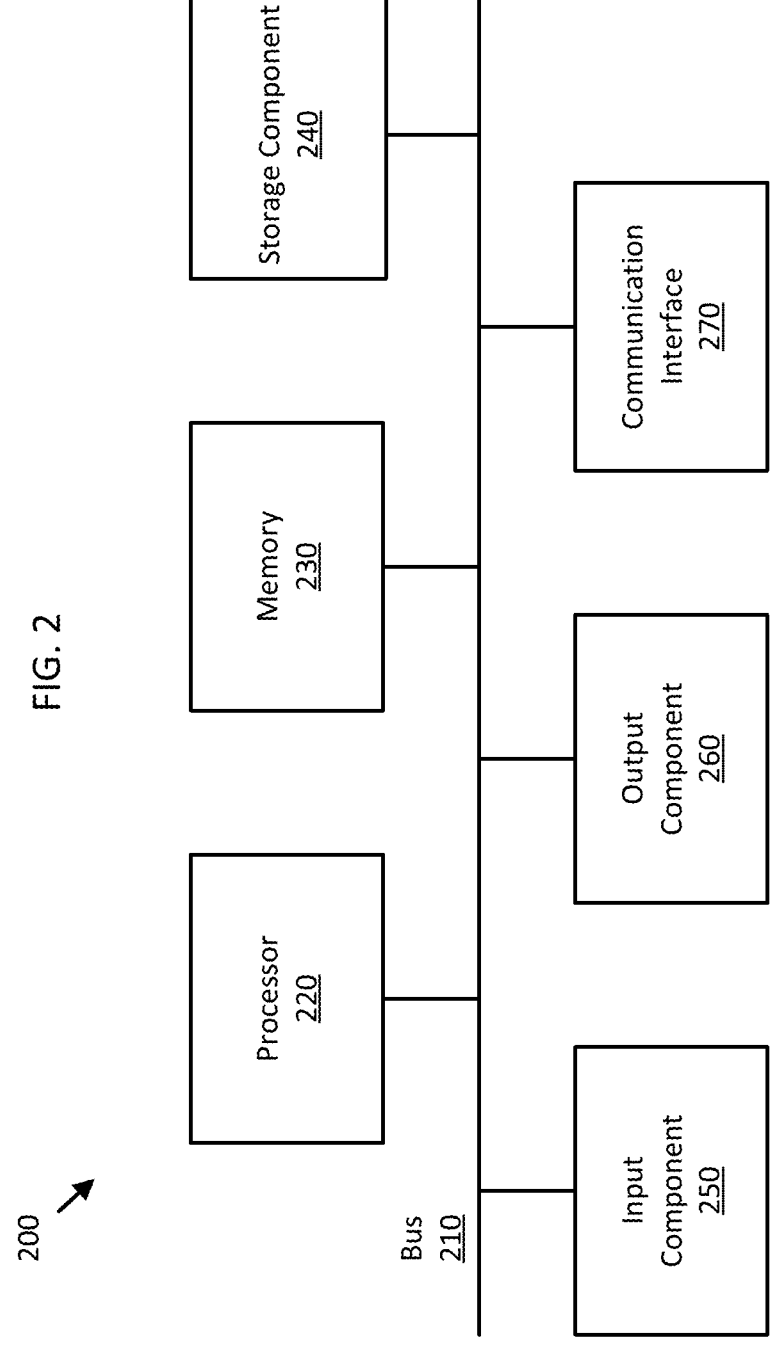
FIG. 2 is a block diagram of example components of one or more devices of FIG. 1, according to embodiments.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
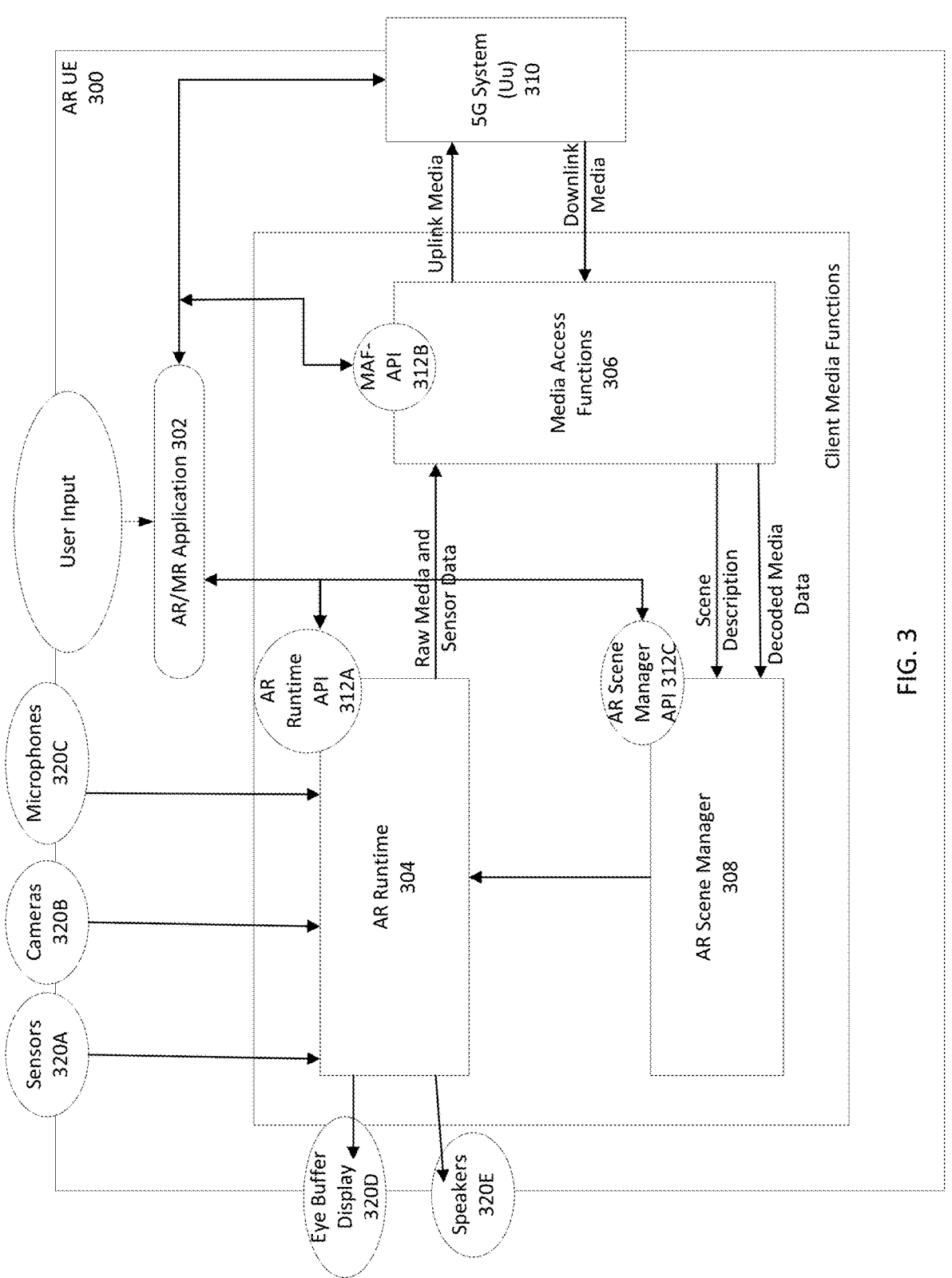
FIG. 3 is a diagram of an architecture of an Augmented/Virtual Reality (AR) user equipment (UE), according to embodiments.

FIG. 3 is a diagram of an architecture of an Augmented Reality (AR) UE 300, according to one or more embodiments. The AR UE 300 may be a 5G UE with 5G connectivity provided through an embedded 5G modem and 5G system components. The AR UE 300 may include several components and user controllers for AR experiences including, but not limited to, sensors 320A, cameras 320B, microphones 320C, eye buffer display 320D, and speakers 320E.

The AR UE 300 may include AR/MR Application 302 that is configured to communicate with various device resources to provide an AR experience to a user. In one or more examples, the AR/MR Application 302 communicates with a AR Runtime 304 via a AR Runtime API 312A, with a Media Access Functions (MAF) via a MAF-API 312B, and a AR Scene Manager 308 via a AR Scene Manager API 312C. These APIs enable the AR/MR Application 302 to discover and query the media capabilities in terms of support as well as available resources at runtime.

In one or more examples, when the AR/MR application 302 is running, the downlink media flows from a 5G System 310 to the MAF 306 in a compressed form, and then from the MAF 306 to the AR Scene Manger 308 in a decoded form. The MAF 306 may further provide a scene description to the AR Scene Manager 308. In one or more examples, in parallel, the AR UE 300 is configured to establish an uplink data flow from the AR Runtime 304 to the MAF 306, where raw media and sensor data may be in an uncompressed form, and then from the MAF 306 to the 5G System 310, where the MAF 306 may have compressed the data in order to facilitate an expected transmission over the network.

Figure 4:
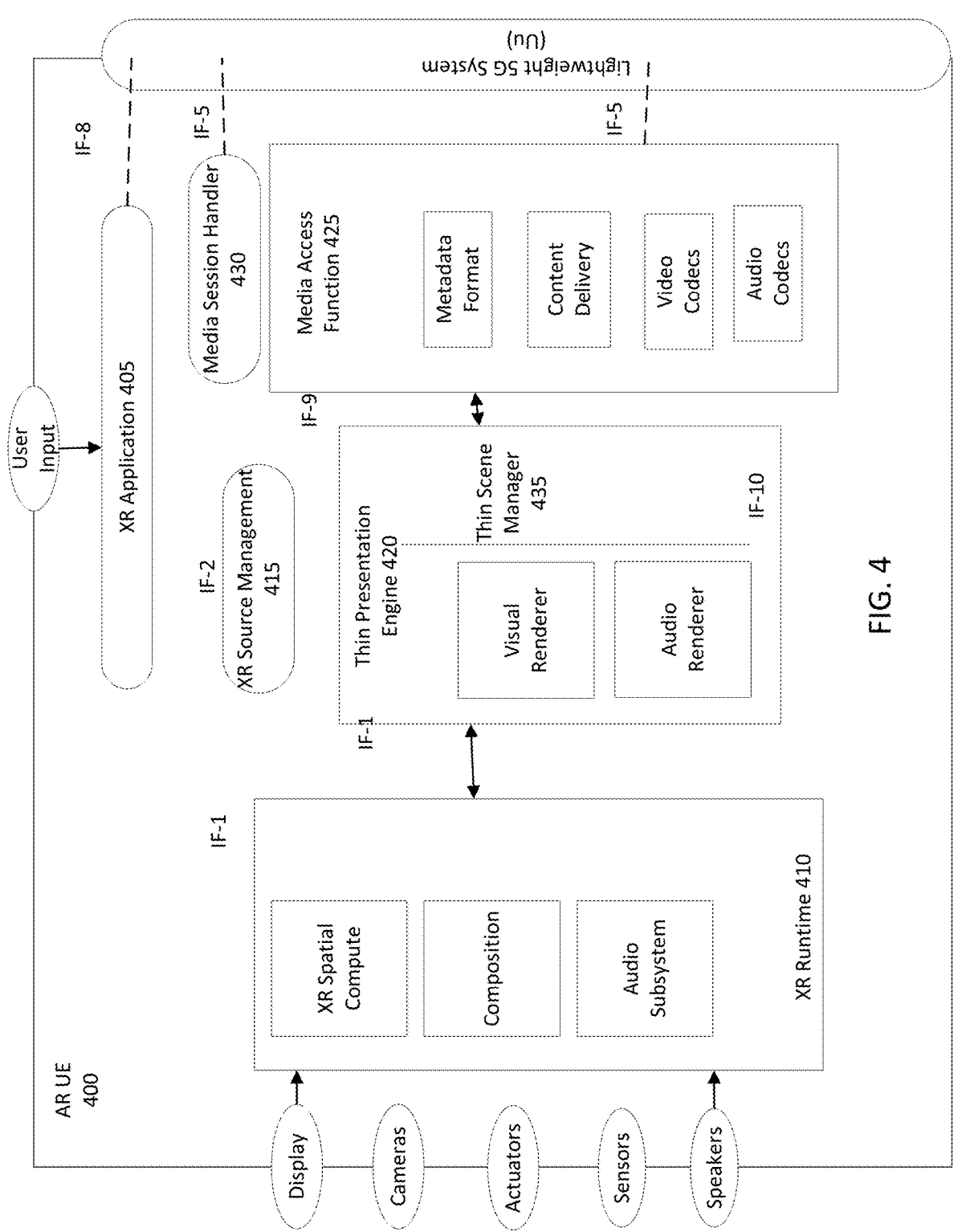
FIG. 4 is a diagram of an architecture of an AR/VR UE, according to embodiments.

FIG. 4 is a diagram of an architecture of an XR base client or XR UE 400, according to one or more embodiments. XR application 405 may be a software application that integrates audio-visual content into the user's real-world environment. CR runtime 410 may be a set of functions that interface with a platform to perform commonly required operations, such as accessing the controller/peripheral state, getting current and/or predicted tracking positions, performing spatial computing, as well as submitting rendered frames to the display processing unit and rendered audio to the speakers with a late stage re-projection to the latest pose. An XR Source Management 415 may manage data sources provided through the XR runtime such as microphones, cameras, trackers, etc., for instance, making the information available to the XR application or providing it to the MAF for sending in the uplink.

A Media Access Function 425 may be a set of functions that enables access to media and other XR-related data that is needed in the Scene manager or XR Runtime to provide an XR experience as well to create delivery formats for information provided by the XR Source Management. A Thin Scene Manager 435 may be a set of functions that supports the application in arranging the logical and spatial representation of a multisensory scene based on support from the XR Runtime. A Thin Presentation Engine 420 may be a set of composite renderers, rendering the component of the scenes, based on the input from the Scene Manager. A Media Session Handler 430 may be a set of functions responsible for handling all 5G control plane operations, such as requesting network assistance, discovering and allocating edge resources, etc. This may be realized as a 5G-RTC MSH, 5GMS Media Session Handler, or any other function.

The above-mentioned function blocks may be integrated together via interfaces. Interfaces may be made of APIs and/or data formats and collectively act as a contract between the two sides of the interface.

The XR Baseline Client may contain the following interfaces. As an example, IF-1 lies between the XR Runtime on one side and the Application (1a), the XR Source Management (1b) and the Presentation Engine (1c). IF-1 is implemented as an API (API-1) that exposes functions provided by the XR Runtime. An example of this API is the Khronos OpenXR API. As an example, IF-2 describes the functions exposed by the XR Source Management that can be accessed and controlled by the XR application, or possibly other functions in the device. IF-2 is typically implemented as an API. As an example, IF-3 lies between the XR Source Management and the Media Access Function and provides serialized information accessible on XR Runtime to the MAF. As an example, IF-4 lies between the Media Access Function and the 5G System for user plane data. As an example, IF-5 lies between the UE and the 5G System, implementing control sessions (such as 5G Media Streaming, IMS). This interface provides for instance the functionality of the RTC-5 interface as defined by TS26.506. As an example, IF-6 lies between the Media Session Handler and the Application/MAF. It offers the tools for them to activate 5G media functionality such as network assistance and edge resource discovery. The IF-6 is realized through an API (API-6). As an example, IF-7 lies between the XR Application and the Media Access function to configure Media Access. This is typically implemented as an API (API-7) that exposes functions of the MAF. As an example, IF-8 is an interface that allows the XR application to make use of 5G System connectivity. As an example, IF-9 lies between the Scene Manager and the Media Access Function. As an example, IF-10 lies between the Scene Manager and the XR Application.

Since the user's physical environment such as the room user is in has some physical constraints, it is important for the application service to consider such constraints when providing the augmented object to be rendered. Currently, no AR/MR parameter describes the physical constraints of the user's environment, particularly defining an available visualization space or a safe zone in that environment where the user can interact with the augmented reality experience. Furthermore, no parameter describes how to dynamically update it during the session and how to signal it in implementations, e.g., OpenXR implementation.

Figure 5:
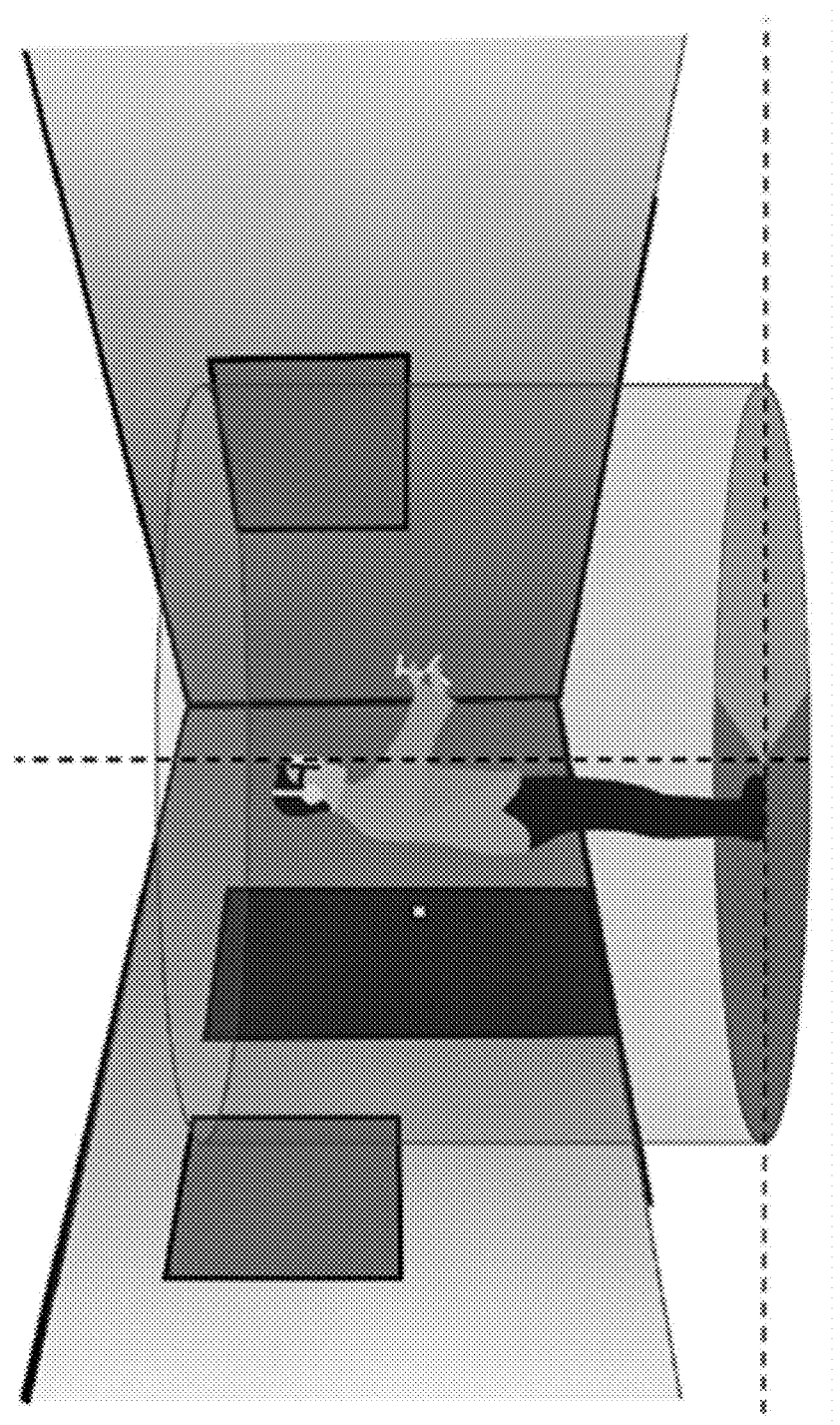
FIG. 5 is an exemplary illustration of the available visual space, according to embodiments.

Immersive experiences in AR/MR offer various types of degrees of freedom (DoF). Depending on the user's surrounding environment, AR/MR experiences may be limited due to the collision between AR visual objects and real ones. This is also true for Virtual Reality (VR) experiences in which the user has no sense of the proximity of the closest objects in the room. It is therefore useful to detect the area in which the AR/MR experience is offered in a comfortable, intelligible, and secure way as illustrated in FIG. 5.

A three-dimensional space within the user's real-word space that is suitable for rendering virtual objects may be called the Available Visualization Space. Such a space may be a shape which is either cube or sphere with the corresponding size and coordinates. In the case that the virtual scene is rendered by a remote entity (e.g. split rendering), this Available Visualization Space may be transmitted to this remote entity so that the composed AR objects remain within the defined Available Visualization Space.

Figure 6:
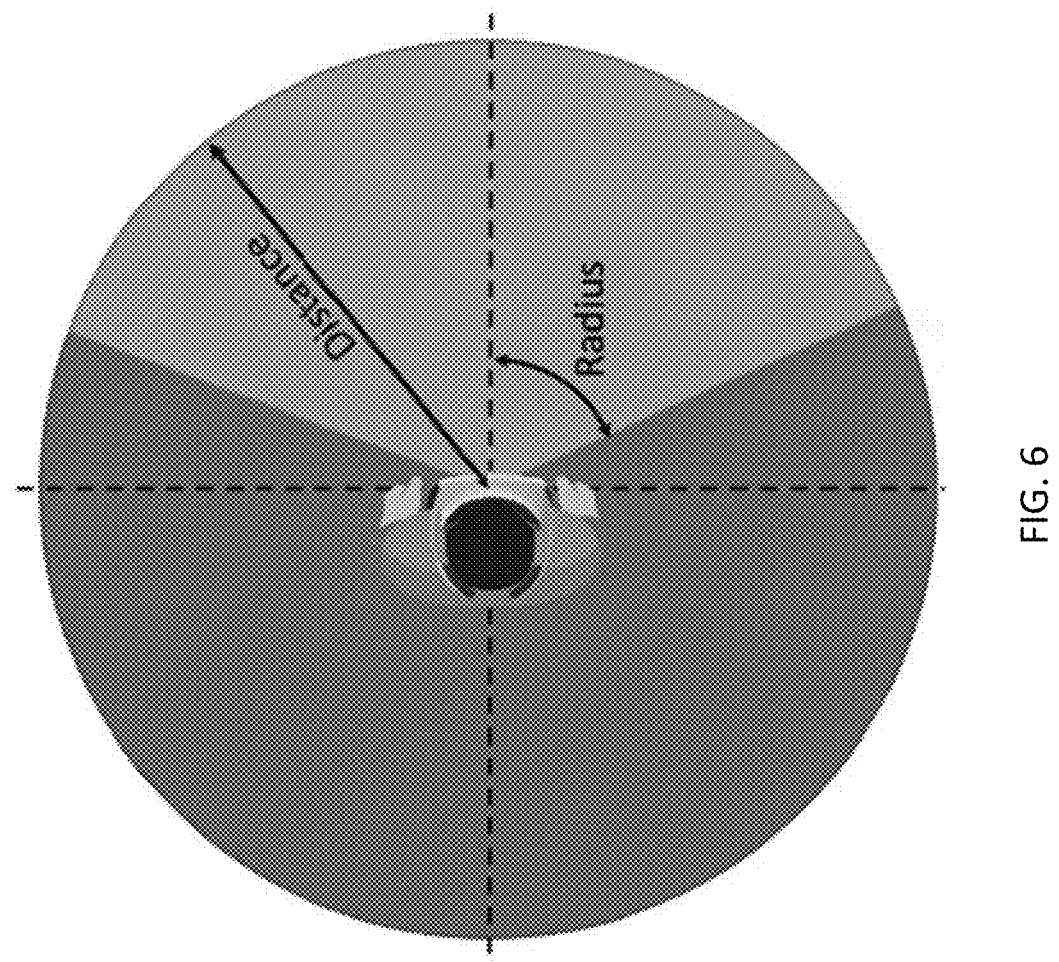
FIG. 6 is an exemplary illustration of the available visual space, according to embodiments.
Figure 7:
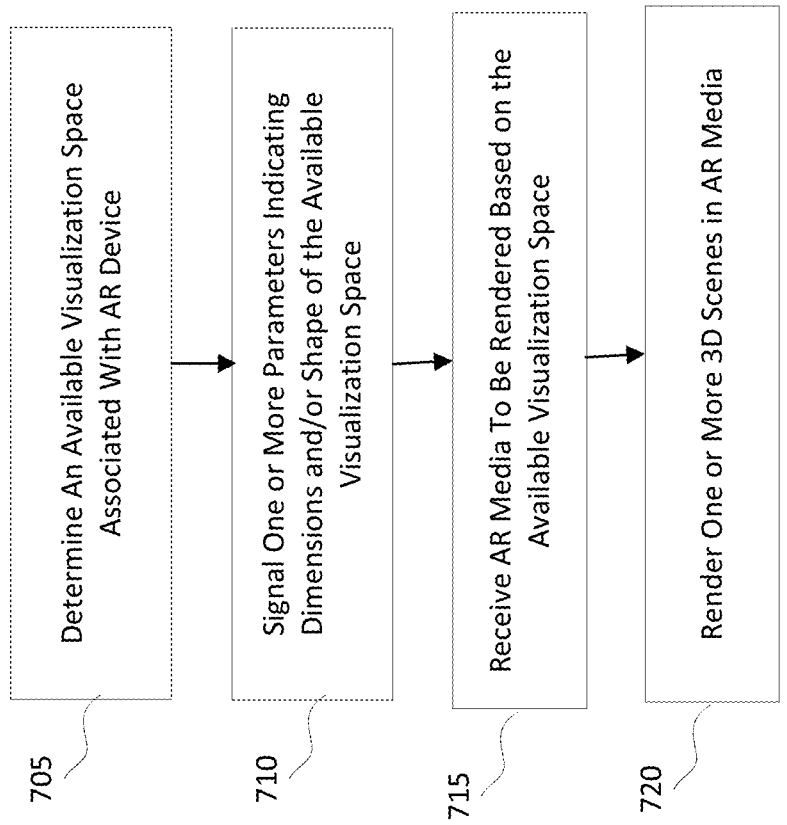
FIG. 7 is flow chart of an example process for signaling available visualization space, according to embodiments.

The available visualization space may be defined by the distance from the user all around him/her and eventually the radius that indicates the field of view in which the AR/MR object is safely placed as shown in FIG. 6. The distance may be an integer expressed in millimeter unit and the radius is an integer expressed in degrees.

In embodiments, a flag parameter may indicate the presence of parameters describing the available visualization space in which visual objects are safely placed. It may be a binary parameter. A distance parameter may be used to indicate Distance from the viewing device expressed in millimeters, meters, etc. A radius parameter may be used to indicate the angle between the center axis of the viewing equipment and the side angle. They may be an integer or floating type parameter.

With the knowledge of the available visualization space, the service provider can limit the immersive experience to the available area. Depending on the service, the user may only see the objects fitting into the safe viewing zone without any visual collision with the real environment. Alternatively, a service provider may decide to only offer immersive experiences compliant with the defined viewing zone. In another scenario, the virtual scene may be scaled down to be displayed as being in the safe viewing zone.

In embodiments, a static Available Visualization Space (AVS) as a space that nay be set at the beginning of the AR/VR experience, and its coordinates and volume are not updated during the session. In contrast, a dynamic AVS is a space that is being updated due to the move of new physical objects in the space, or due to the user moving in new physical surroundings. The dynamic AVS coordinates and volume may be updated and sent to the application or the network.

In embodiments, the device may set a frequency for measuring the available visualization space (AVS), i.e. at a certain frequency in time, it reassesses the AVS and updates its coordinates and volume. In embodiments, the device sets an event for any changes in available visualization space (AVS). If any new objects/obstacles are detected in the scene, an event may be issued for re-measuring the available AVS. In embodiments, In the case of polling acquisition, with each acquisition, the new measure may be sent to the application or the network. In embodiments, if any changes occur in the characteristics of the AVS (the coordinates, the volume, or the shape), the new update is reported to the application or the network.

In embodiments, event-based dynamic AVS may be implemented in OpenXR as follows:

Step 1—The application may request XR Source Management for the event-based dynamic AVS reporting with a maximum frequency.

Step 2—If the device XR runtime may support the event-driven acquisition, the XR Source Management sets that event with the maximum frequency received from the application. Otherwise, the XR Source Management may poll the AVS from the XR runtime with the frequency defined in Step 1.

Step 3—In the case of event-driven acquisition, the XR runtime may report any changes in AVS when a change occurs. In the case of polling, the XR runtime updates AVS and reports it whenever the AVS is polled by XR Source management.

Step 4—The device XR Source management may report the application and/or the network the updated AVS parameters when a change occurs in them. The XR Source management may assure the frequency of reporting is no more than the maximum frequency set in Step 1.

In embodiments, event-based dynamic AVS may be implemented in OpenXR using the OpenXR API for XR Runtime. OpenXR XR_FB_scene extension may be used to to define a boundary space. XrGetSpaceBoundingBox3DFB may provide the defined rectangular cube XrRect3DfFB (by defining the offset XrOffset3DfFB and the extend XrExtent3DfFB, in x, y, z dimensions). XrGetSpaceSemanticLabelsFB may be used to describe the semantic meaning of the boundary space as the AVS spec. We use the semantic keyword "available visualization space" as the indicator of AVS.

In embodiments, the available visualization space may be a cuboid available visualization space or a spherical available visualization space. XRMSFTscene_understanding may be used to set the available visualization space. XrSceneOrientedBoxBoundMSFT may be used for defining a cuboid available visualization space or to define the center and radius of the sphere that defines the available visualization space.

TABLE 1

| Available Visualization Space | | | |
|---|---|---|---|
| Name | Type | Cardinality | Description |
| availableVisualizationSpace | Object | 0 . . . 1 | An object defining the coordinate of the available visualization space. |
| cuboid | Object | 0 . . . 1* | The available visualization space in form of cuboid. The 3D coordinates are expressed in the XR Space identified by xrSpaceId. |
| x | float | 1 | Offset of the available visualization space starting point in the x direction. |
| y | float | 1 | Offset of the available visualization space starting point in the y direction as defined by the Open XR coordinate system. |
| z | float | 1 | Offset of the available visualizations pace starting point in the z direction. |
| width | float | 1 | The width of available visualization space in the x direction as defined by the Open XR coordinate system . . . |
| height | float | 1 | The height of available visualization space in the y direction. |
| depth | float | 1 | The depth of available visualization space in the z direction. |
| sphere | Object | 0 . . . 1* | The available visualization space in form of a sphere. The 3D coordinates are expressed in the XR Space identified by xrSpaceId |

TABLE 1-continued

| Available Visualization Space | | | |
| --- | --- | --- | --- |
| Name | Type | Cardinality | Description |
| x | float | 1 | Offset of the available visualization space center in the x direction as defined by the Open XR coordinate system. |
| y | float | 1 | Offset of the available visualization space center in the y direction. |
| z | float | 1 | Offset of the available visualization space center in the z direction. |
| radius | float | 1 | The radius of available visualization space. |

Any devices and apparatus of FIGS. 3 and 4 may be used to signal and transmit the available visualization space.

FIG. 6 illustrates an example process 700 for signaling available visualization space associated with a user or a user device.

At operation 705, an available visualization space associated with the AR user device may be determined, the available visualization space may be a three-dimensional space within the user's real-word space that is suitable for rendering virtual objects.

At operation 710, one or more parameters that indicate dimensions of the available visualization space may be signaled. The one or more parameters may indicate a shape of the available visualization space.

In embodiments, the shape of the available visualization space is a cuboid. The one or more parameters signaled may include first length, second length, and third length. The first length, the second length, and the third length are measured from the AR user device.

In embodiments, the shape of the available visualization space is spherical. The one or more parameters signaled may include a radius. In embodiments, the radius is measured from the AR user device.

In embodiments, one or more parameters are included in a scene extension function that is used to define a boundary space and one or more objects in the boundary space. In embodiments, the scene extension function is openXR XR_FB_scene extension, and the one or more parameters comprises a xrGetSpaceSemanticLabelsFB to describe a semantic meaning of the available visualization space.

In embodiments, the one or more parameters are signaled as parameters or arguments to an interface function. In embodiments, one or more parameters includes a XrSceneOrientedBoxBoundMSFT function. In embodiments, the one or more parameters includes a XrSceneSphereBoundMSFT function.

At operation 715, AR media to be rendered may be received based on the available visualization space, the AR media comprising one or more three-dimensional (3D) scene.

At operation 720, the one or more 3D scenes may be rendered.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above may be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for signaling available visualization space associated with a user in a mixed reality application, the method being executed by at least one processor, the method comprising:

determining, by an augmented reality (AR) enabled user device, an available visualization space associated with the AR user device, a shape of the available virtualization space is expressed in an XR Space and identified by xrSpaceId;

signaling, by the AR user device, one or more parameters that indicate dimensions of the available visualization space;

receiving, by the AR user device, AR media to be rendered based on the available visualization space, the AR media comprising one or more three-dimensional (3D) scene; and rendering the one or more 3D scene.

2. The method of claim 1, wherein the shape of the available visualization space is a cuboid.

3. The method of claim 2, wherein the one or more parameters signaled comprises:

a first length;

a second length; and a third length.

4. The method of claim 3, wherein the first length, the second length, and the third length are measured from the AR user device.

5. The method of claim 2, wherein the one or more parameters comprises a XrSceneOrientedBoxBoundMSFT function.

6. The method of claim 1, wherein the shape of the available visualization space is spherical.

7. The method of claim 6, wherein the one or more parameters signaled comprises a radius.

8. The method of claim 7, wherein the radius is measured from the AR user device.

9. The method of claim 6, wherein the one or more parameters comprises a XrSceneSphereBoundMSFT function.

10. The method of claim 1, wherein the one or more parameters are included in a scene extension function that is used to define a boundary space and one or more objects in the boundary space.

11. The method of claim 10, wherein the scene extension function is openXR XR_FB_scene extension, and the one or more parameters comprises a xrGetSpaceSemanticLabelsFB to describe a semantic meaning of the available visualization space.

12. The method of claim 1, wherein the one or more parameters are signaled as parameters or arguments to an interface function.

13. An apparatus for signaling available visualization space associated with a user in a mixed reality application, the apparatus comprising:

at least one memory configured to store program code; and at least one processor configured to read the program code and operate as instructed by the program code, the program code including:

determining code configured to cause the at least one processor to determine by an augmented reality (AR) enabled user device, an available visualization space associated with the AR user device, a shape of the available virtualization space is expressed in an XR Space and identified by xrSpaceId;

signaling code configured to cause the at least one processor to signal by the AR user device, one or more parameters that indicate dimensions of the available visualization space;

receiving code configured to cause the at least one processor to receive by the AR user device, AR media to be rendered based on the available visualization space, the AR media comprising one or more three-dimensional (3D) scene; and rendering code configured to cause the at least one processor to render the one or more 3D scene.

14. The apparatus of claim 13, wherein the shape of the available visualization space is a cuboid.

15. The apparatus of claim 14, wherein the one or more parameters signaled comprises: a first length; a second length; and a third length.

16. The apparatus of claim 13, wherein the shape of the available visualization space is spherical.

17. The apparatus of claim 16, wherein the one or more parameters signaled comprises a radius.

18. A non-transitory computer readable medium having instructions stored therein, which when executed by a processor cause the processor to execute a method for signaling available visualization space associated with a user in a mixed reality application, the method comprising:

determine, by an augmented reality (AR) enabled user device, an available visualization space associated with the AR user device, a shape of the available virtualization space is expressed in an XR Space and identified by xrSpaceId;

signal, by the AR user device, one or more parameters that indicate dimensions of the available visualization space;

receive, by the AR user device, AR media to be rendered based on the available visualization space, the AR media comprising one or more three-dimensional (3D) scene; and render the one or more 3D scene.

19. The non-transitory computer readable medium of claim 18, wherein the shape of the available visualization space is a cuboid.

20. The non-transitory computer readable medium of claim 18, wherein the shape of the available visualization space is spherical.

\* \* \* \* \*